J. C. F. McGRIFF.
TRAILER FOR AUTOMOBILES.
APPLICATION FILED OCT. 31, 1916.
1,325,162.
Patented Dec. 16, 1919.
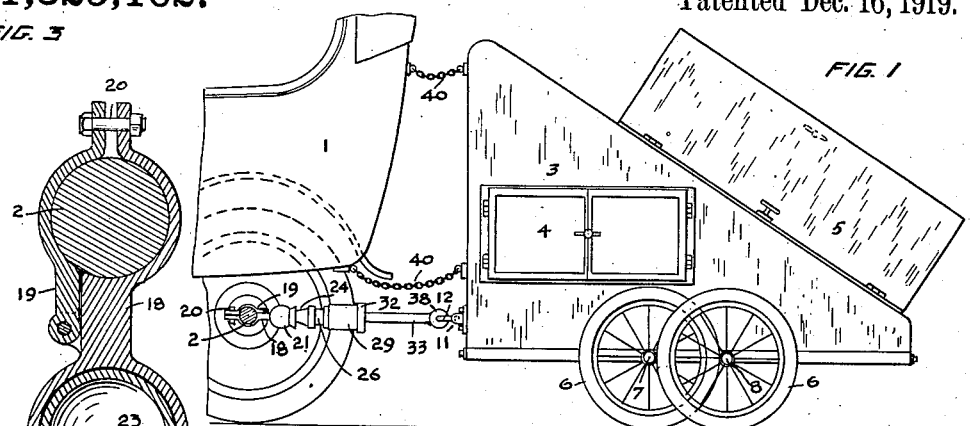
INVENTOR
J. C. F. McGRIFF
by A. S. Paré
ATTY.

UNITED STATES PATENT OFFICE.

JOHN C. F. McGRIFF, OF OAKLAND, CALIFORNIA.

TRAILER FOR AUTOMOBILES.

1,325,162.      Specification of Letters Patent.      Patented Dec. 16, 1919.

Application filed October 31, 1916. Serial No. 128,665.

*To all whom it may concern:*

Be it known that I, JOHN C. F. McGRIFF, a citizen of the United States, residing at Oakland, county of Alameda, State of California, have invented certain new and useful Improvements in Trailers for Automobiles, whereof the following is a specification.

This invention relates to trailers for automobiles, etc., and its object is to produce a trailer, and means for attaching the same to the vehicle, which will provide for all the necessary motions of the vehicle and the trailer, without shock or unnecessary friction, and which will also be most simple and effective for use.

In carrying out the invention I provide a trailer, mounted upon four wheels, whose axles are arranged close together, whereby kingbolt devices are unnecessary, and the trailer will negotiate curves with a minimum of wheel slip, and will also stand firmly without tilting when at rest.

The body of the trailer I make of wedge form, with doors in the lateral sides and in the top, whereby great convenience of access is secured.

The trailer is attached to the vehicle by means of a link, or links, which comprise, in each link, a clip for engagement of the axle of the vehicle, a backward extending bar, from the clip, the same including a universal joint, of ball and socket, or other form, a buffer spring with suitable connections, and a traveling bearing, which may be provided with antifriction balls, for connection to certain bails upon the trailer.

The front of the trailer has attached thereto, by bolts or otherwise, bail sockets, for receiving the ends of the bails. These sockets may include tug springs, when desired. The bails are in the form of curved rods having projecting ends which enter the sockets, and the body of the bails curve forward toward the vehicle, and engage the traveling bearings which move along them when the vehicle goes around a curve.

The foregoing general description is not intended to limit my invention, but to be read in connection with the accompanying one sheet of drawing, in which I have illustrated the invention in its best form, and in which:—

Figure 1 is an elevation of my trailer, and part of an automobile to which it is attached.

Fig. 2 is an under view of the trailer, showing the bracing rods, the wheel and axle arrangement, and the bails.

Fig. 3 is a longitudinal section of a part of the connecting link which attaches to the axle of the automobile and extends back toward the trailer. The view is on an enlarged scale.

Fig. 4 is a similar section of the end of the same which connects to the bail on the trailer, and shows the traveling bearing, with its balls. The view is taken at right angles to the view in Fig. 3.

Fig. 5 is a front view of part of the trailer showing bails in their sockets, two of the sockets being sectioned to better show the engagement of the bails therewith. The view is on an intermediate scale between that of Figs. 1 and 2, and that of Figs. 3 and 4. The dotted lines show how the bails may rotate in the sockets, to turn down or up, under certain conditions.

Fig. 6 is a side view of a corner of the trailer, showing the bail and a socket.

Fig. 7 is a horizontal section of a corner of the trailer, showing the bail and a socket with the socket stem extending through and engaging a tug spring, which is housed in the trailer body.

In these figures:—1 is the back end of an automobile, and 2 the axle thereof. Behind the automobile is the trailer, 3, the body of which is preferably of wedge shape, as shown, the broad end of the wedge being forward. 4 and 5 are doors giving access to the interior of the body. The trailer rides upon the wheels 6, mounted on the axles 7 and 8; these axles are arranged close together, near the center of gravity of the trailer. By this arrangement the trailer will rest upon the wheels without tilting, and its tilting in use is controlled, at the same time the device can round a corner without undue slipping of the wheels upon the ground. The body of the trailer is braced by the brace rods 9, extending from a central ring 10 to suitable points on the periphery of the body.

To the front of the trailer are bolted, or otherwise secured the sockets 11, of which the central socket may be double, as shown. These sockets serve for engagement of the ends of bails 12, of which I have shown two. The bails are curved forward, and may project rigidly from the sockets, or may rotate therein, as preferred. The structure for this purpose, will be readily understood without further description. The dotted lines, in Figs. 5 and 6, indicate positions which the bails may assume, when rotated in the sockets. It will be observed that the ends of the bails do not reach the bottoms of the sockets, thus leaving a space to accommodate expansion and prevent binding. The sockets 11 may be provided with a stem 13, extending back through the wall of the trailer body, and having a washer 14, secured by a nut 15, or otherwise. Between the washer 14 and the wall of the trailer, I place a spring 16, which acts as a tug spring to cushion the draft upon the bail and socket. The housing 17 incloses and protects the parts, and may be bolted to the wall just mentioned.

The attaching means consists of the following parts. A clip 18, having the hinged member 19 and securing bolt 20, embraces the axle 2 of the vehicle. I contemplate the use of two of these devices, one on each side of the transmission gear, in the case of automobiles with a central transmission. At the rear end of the clip is the spherical socket 21, with a flaring mouth flange 22, to limit the play of the engaging member. The engaging member comprises the ball 23, seated in the spherical socket 21, and having the stem 24 extending back to the screw coupling 25, into which it is threaded. Thence the stem extends back in the form of a second piece 26, also threaded into the coupling 25. The piece 26 carries at its rear end a flange 27 and a buffer 28. The parts are within a tubular connector 29, and the flange 27 engages an interior shoulder 30 on said connector. A washer 31 may be inserted between these two parts. At the opposite end of the member 29, is a screw cap 32. Through this cap extends the stem 33, which, like the parts 24 and 26, may be tubular. Into the forward end of the stem 33 is screwed a plug carrying a flange 34, which engages the cap 32 to prevent separation of the parts. A washer 35 may be interposed between the flange and the cap. The screw plug, in addition to the flange 34, also carries a buffer 36, which under certain conditions may contact the buffer 28. 37 is a spring, housed by the tube 29, and bearing against the flanges 27 and 34, and centered by the buffers 28 and 36. This spring is a buffer spring and serves to cushion any shock due to stopping of the vehicle, or other cause, and also facilitates the rounding of curves. At the rear end of the stem 33 is a bearing 38, which embraces and travels upon the bail 12. The bearing may be provided with balls 39, to facilitate the motion of the two parts. When desired guard chains 40 may be employed, between the vehicle 1 and the trailer 3, but these will ordinarily be inert.

In use the vehicle pulls the trailer after it by means of the members just described, connecting the axle 2 with the bails 12. Any sudden jerk of the vehicle, or resistance of the trailer due to any cause whatever, will be cushioned by the spring 16, and any sudden reduction of the distance between the vehicle and the trailer will be cushioned by the buffer springs 37. Both these sets of springs will coöperate to facilitate the rounding of curves.

Having thus described my invention, and an embodiment of it, in the full, clear and exact terms required by law, and knowing that it comprises novel, useful and valuable improvements in the art to which it pertains, I here state that I do not wish to be limited to the precise construction and arrangement of the several parts, as herein set forth, as the same may be variously modified by a skilful mechanic without departing from the spirit of the invention. What I claim and desire to secure by Letters Patent of the United States, is the following, to wit:—

1. A vehicle trailer having two members connecting it to the motor vehicle, and provided with two bails engaged by said members said members having traveling bearings which travel laterally of the trailer upon said bails.

2. A vehicle trailer having a curved bail pivotally mounted thereon, a connecting member engaging said bail and connecting it to the motor vehicle, said member provided with a traveling ball bearing traveling upon said curved bail.

3. A vehicle trailer having one or more members adapted to connect it to the axle of the vehicle, said members provided with ball and socket joints, the socket having a flaring mouth flange adapted to limit the play of the engaging member.

4. A vehicle trailer having one or more members adapted to connect it to the vehicle, said members engaging the axle of the vehicle, and engaging also bails upon the trailer, said bails mounted in sockets and said sockets provided with tug springs.

5. A vehicle trailer having members for connecting it to the vehicle, said members provided at one end with hinged clips adapted to engage the vehicle axle and at the opposite ends with traveling bearings engaging said trailer and therebetween provided with universal joints and buffer springs to cushion shocks.

In testimony that I claim the foregoing I have hereto set my hand in the presence of two witnesses, this 16th day of October, 1916.

JOHN C. F. McGRIFF.

Witnesses:
LORING B. DOE.
GRACE PARÉ.